(12) United States Patent
Han et al.

(10) Patent No.: US 11,954,179 B2
(45) Date of Patent: Apr. 9, 2024

(54) RESOLVING OUT OF SEQUENCE DATA IN SENSOR TRACKING

(71) Applicant: Inceptio Technology, Inc., Fremont, CA (US)

(72) Inventors: Yu Han, Fremont, CA (US); Yu Liu, Fremont, CA (US)

(73) Assignee: Inceptio HONGKONG Limited, Hong Kong (HK)

( * ) Notice: Subject to any disclaimer, the term of this patent is extended or adjusted under 35 U.S.C. 154(b) by 804 days.

(21) Appl. No.: 17/018,069

(22) Filed: Sep. 11, 2020

(65) Prior Publication Data

US 2022/0083825 A1 Mar. 17, 2022

(51) Int. Cl.
*G06V 20/58* (2022.01)
*G06F 18/25* (2023.01)
*H04L 47/34* (2022.01)
*H04L 67/12* (2022.01)

(52) U.S. Cl.
CPC .......... *G06F 18/251* (2023.01); *G06F 18/253* (2023.01); *G06F 18/256* (2023.01); *G06V 20/58* (2022.01); *H04L 47/34* (2013.01); *H04L 67/12* (2013.01)

(58) Field of Classification Search
CPC .... G06F 18/251; G06F 18/253; G06F 18/256; G06V 20/58; H04L 47/34; H04L 67/12; H04W 4/024; H04W 4/025; H04W 4/38; H04W 4/44
See application file for complete search history.

(56) References Cited

U.S. PATENT DOCUMENTS

| | | | |
|---|---|---|---|
| 8,190,948 B1 * | 5/2012 | Marshak | H04L 47/34 714/18 |
| 2016/0021018 A1 * | 1/2016 | Hui | H04L 45/22 370/412 |
| 2017/0060810 A1 * | 3/2017 | Preston | G06F 30/15 |
| 2019/0138825 A1 * | 5/2019 | Lee | B60W 40/072 |

(Continued)

FOREIGN PATENT DOCUMENTS

| CN | 108846427 A | * 11/2018 | ........ G06K 9/6288 |
|---|---|---|---|
| CN | 109886305 B | * 5/2021 | |

OTHER PUBLICATIONS

Mallick et al. "Nonlinear Out-of-sequence Measurement Filtering with Applications to GMTI Tracking", pp. 291-294 (Year: 2002).*

*Primary Examiner* — Eyob Hagos
(74) *Attorney, Agent, or Firm* — Sheppard Mullin Richter & Hampton LLP

(57) ABSTRACT

Provided herein is a system and method to fuse data from sensors. The system includes sensors configured to capture data associated with one or more targets, the data including timestamps indicating originating times, one or more processors, and a memory storing instructions that, when executed by the one or more processors, causes the system to perform obtaining, at a filter, transmitted data associated with the one or more targets from the plurality of sensors, from the obtained data, identifying an unsequenced measurement having a timestamp before a second timestamp of a second measurement but obtained at the filter after the second measurement was obtained at the filter, updating a state of the filter according to the unsequenced measurement, based on a nonlinear measurement model and a nonlinear process model.

14 Claims, 11 Drawing Sheets

(56) References Cited

U.S. PATENT DOCUMENTS

| 2019/0182627 A1* | 6/2019 | Thoresen | H04L 63/045 |
| 2020/0226434 A1* | 7/2020 | Li | G06F 18/00 |
| 2021/0004613 A1* | 1/2021 | Yang | G06V 20/56 |
| 2021/0166087 A1* | 6/2021 | Stueck | G06T 7/70 |

* cited by examiner

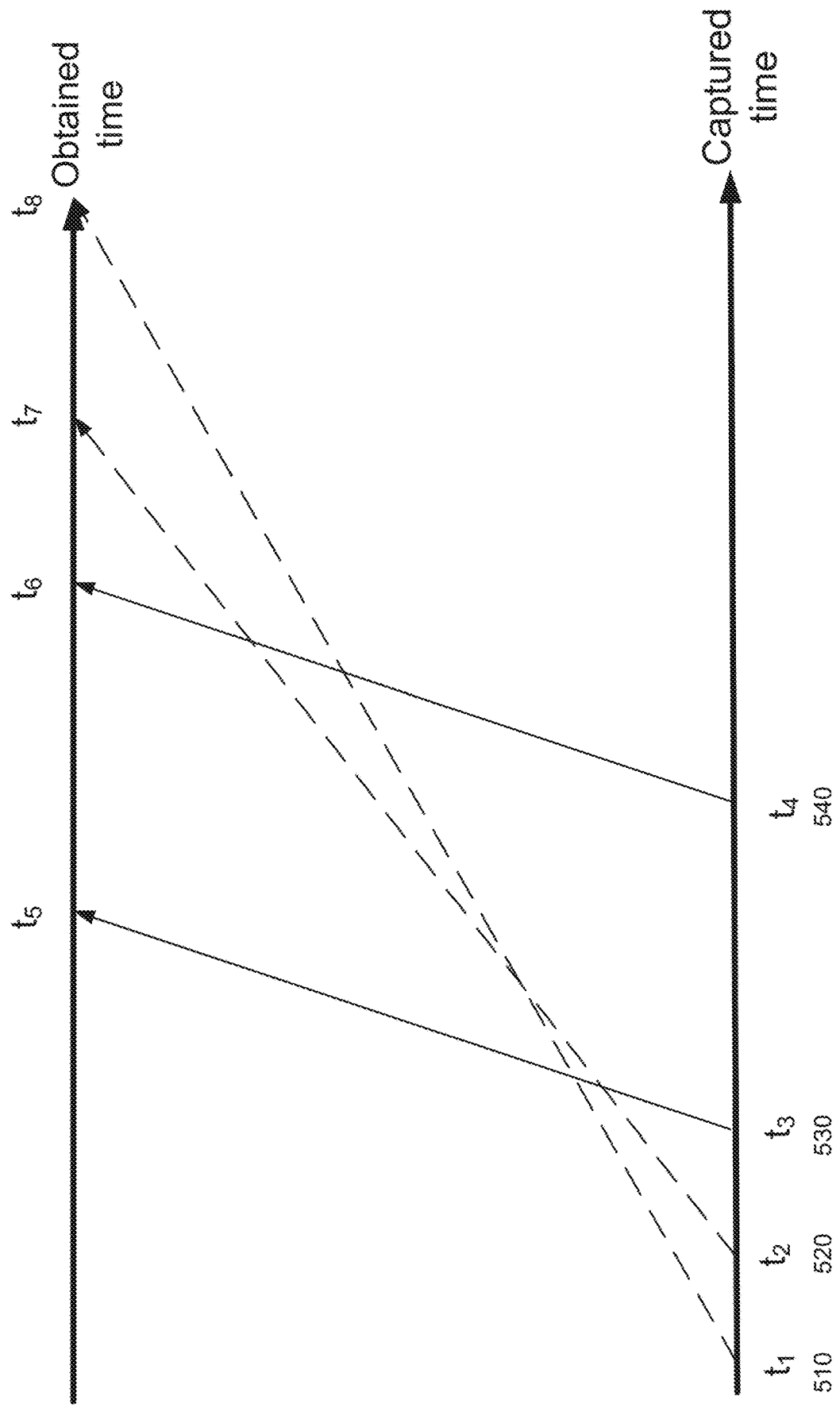

RESOLVING OUT OF SEQUENCE DATA IN SENSOR TRACKING

BACKGROUND

A surveillance system may include multiple sensors to track targets and a node or processor that fuses data from the multiple sensors, such as Radar, Lidar, Ultrasonic Sensor, and an optical sensor. The resulting data may be more accurate and complete compared to data from only a single sensor, or data from different sensors that is not fused. In particular, one sensor may compensate for a weakness of another sensor. For example, a visual sensor having a time delay can correct an accumulated error of an inertial sensor. Potential obstacles to be addressed during the data fusion include clutter, false alarms, confusion of associating a particular portion of data with a target, and different transmission rates and associated latency of the sensors when sending the data to a node or processor. The data fusion is made more complicated when any nonlinear models are used to predict or measure data.

SUMMARY

The current approach, in one embodiment, fuses sensor data including unsequenced measurements, categorizations, or characterizations (hereinafter "measurement" or "measurements") that were captured earlier than but arrived later than another measurement at a processor, which may include a node or a central processor. Any reference to "measurement" or "measurements" may include categorizations, classifications, or characterizations, when relevant or appropriate. The node or central processor may program, control, and/or implement a filtering algorithm to fuse the sensor data. A subsequent reference to a filter may refer to a filtering algorithm carried out by a portion of the processor, and a state of a filter may refer to a current state of or associated with a most recently received measurement by the processor in which a filtering algorithm is being carried out.

Described herein are systems and methods to fuse sensor data. Various embodiments of the present disclosure provide a plurality of sensors configured to capture data associated with one or more targets, the data including timestamps indicating capture times or originating times, one or more processors, and a memory storing instructions that, when executed by the one or more processors, causes the system to perform operations. In some embodiments, capture times may be synonymous with originating times. The operations may include obtaining, at the filter or at a processor, transmitted data associated with the one or more targets from the plurality of sensors. The transmitted data may include the timestamps. The operations may further include, from the obtained data, identifying an unsequenced measurement having a timestamp before a second timestamp of a second measurement but obtained at the filter or at the processor after the second measurement was obtained at the one or more processors. The operations may further include, updating a state of the filter according to the unsequenced measurement, based on a nonlinear measurement model and a nonlinear process model. The updating may further be based on other measurements from the obtained transmitted data.

In some embodiments, the updating a state of the filter comprises retrodicting the state to a time that the unsequenced measurement was captured. Retrodicting may include predicting the state backwards in time to an originating time of the unsequenced measurement, which may be the time that the unsequenced measurement was captured by a sensor.

In some embodiments, the retrodicting comprises identifying whether the filter has been initialized by an initial measurement, the initial measurement originating before the originating time of the unsequenced measurement; and the retrodicting the state of the filter is based on the identification of whether the filter has been initialized by the initial measurement that originated before the originating time of the unsequenced measurement.

In some embodiments, in response to identifying that the filter has been initialized by the initial measurement that originated before the originating time of the unsequenced measurement, the retrodicting the state of the filter comprises calculating or determining a value of the state based on interpolation between a value of an immediately preceding state to the unsequenced measurement and a value of an immediately subsequent state to the unsequenced measurement.

In some embodiments, the immediately preceding state comprises the second measurement captured at the second time, the second timestamp of the immediately preceding state indicating the second time being closest to the time, out of all times that data was captured prior to the state; and a third timestamp of the immediately subsequent state indicating a third time that the immediately subsequent state was captured, the third time being closest to the unsequenced measurement out of all times that data was captured after the state.

In some embodiments, in response to retrodicting the value of the state, the instructions further cause the one or more processors to perform determining a reverse transition matrix indicating a transition between a fourth time and the time, the fourth time indicating an originating time of a measurement that was obtained by the filter immediately before the unsequenced measurement was obtained by the filter.

In some embodiments, the reverse transition matrix is based on an inverse of a partial derivative of a nonlinear transition function with respect to the state corresponding to the time. The nonlinear transition function may be included in the nonlinear process model. The nonlinear transition function may be represented by a transition matrix.

In some embodiments, the instructions further cause the one or more processors to perform removing or reducing a weight of a portion of data that deviates from the nonlinear measurement model by more than a threshold model.

In some embodiments, in response to identifying that the filter has not been initialized by an initial measurement that originated before the originating time of the unsequenced measurement, the updating the state of the filter comprises determining a reverse transition matrix indicating a transition between a fourth time and the time, the fourth time indicating a capture time or originating time of an immediately preceding measurement to the unsequenced measurement obtained by the filter.

In some embodiments, the reverse transition matrix is determined based on a partial derivative of the nonlinear transition function with respect to the state corresponding to the fourth time.

In some embodiments, the reverse transition matrix is determined based on an inverse of a partial derivative of a function represented by a transition matrix with respect to the state corresponding to the fourth time.

In some embodiments, the state indicates at least positions and velocities of the one or more targets. In some embodiments, other variables such as accelerations may also be indicated.

Various embodiments of the present disclosure provide a method implemented by a system as described above.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 3-4, 5A-5B illustrate exemplary scenarios of how data from different unsequenced tracks are processed and fused.

DETAILED DESCRIPTION

In some situations, during a process of data fusion, if a filter receives an unsequenced measurement, the filter may retrodict its status to a time that the unsequenced measurement was captured. In completely nonlinear systems, for example, when a process model and a measurement model used by the filter are both nonlinear, a state transition matrix and a reverse transition matrix between two states at different times are difficult to explicitly obtained. In an effort to address such challenges, while reducing a processor burden, the system described in this Application provides an accurate method for the filter to retrodict its status in response to unsequenced measurement and reliably fuse data from different sensors, while conserving memory resources. By carrying out this method, a processor is not required to wait for all measurements to be received at the filter before processing, thereby increasing efficiency of processing as a result of reducing latency.

Figure 1:
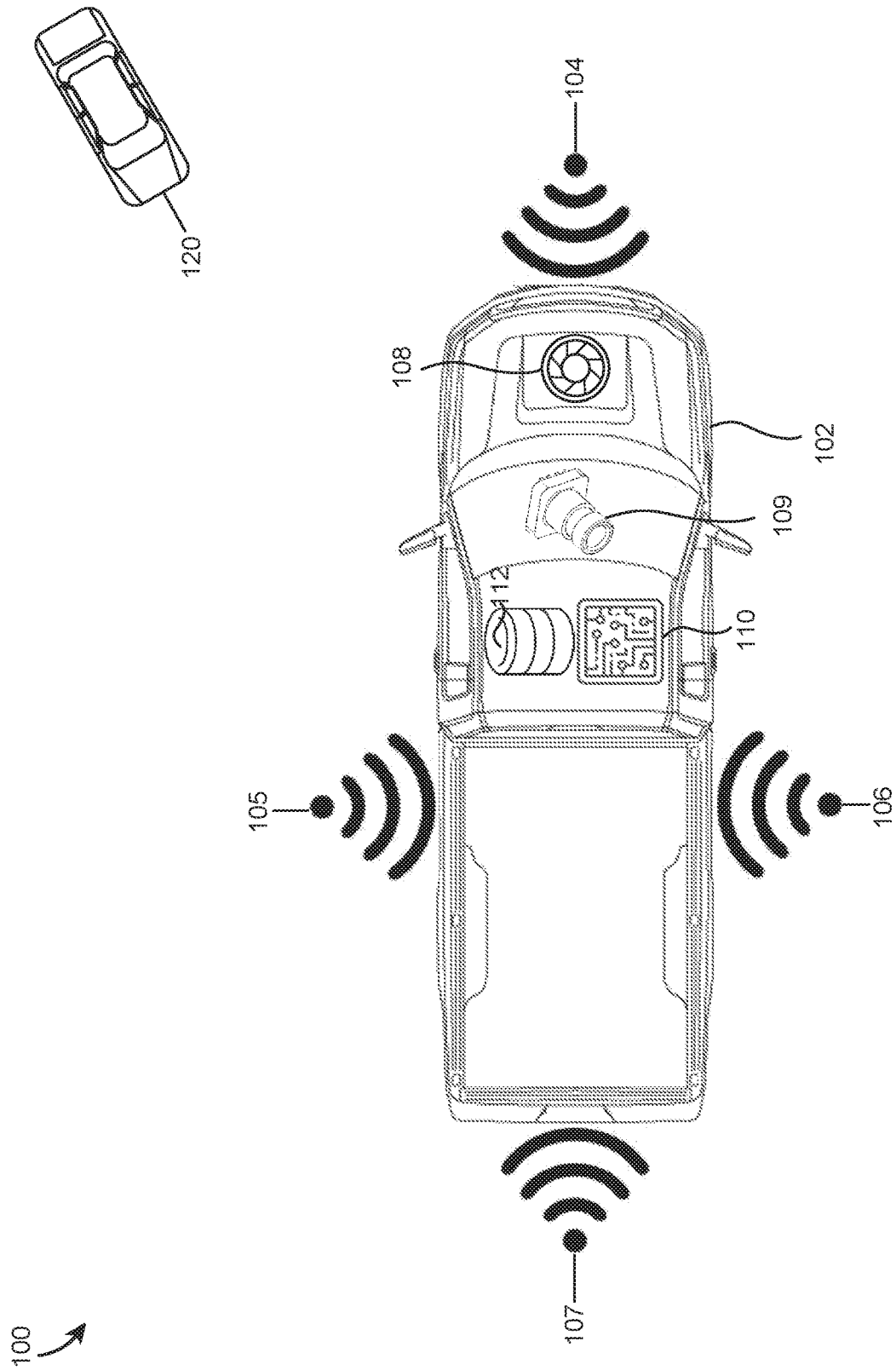
FIG. 1 illustrates an example environment of a system that fuses data from one or more targets according to an embodiment of the present disclosure.

FIG. 1 illustrates an example environment 100 of a system implemented on a vehicle 102 such as a truck, that estimates a target heading and navigates based on the estimated target heading. In some embodiments, the vehicle 102 may navigate through roads, streets, and/or terrain with limited or no human input. The word "vehicle" or "vehicles" as used in this paper includes vehicles that travel on ground, such as a truck or bus, but may also include vehicles that travel in air such as drones, airplanes, and helicopters, and vehicles that travel on water such as boats or submarines.

The vehicle 102 may include sensors such as Radars 104, 105, 106, and/or 107, Lidar 108, camera 109, GPS, ultrasonic, IMU (inertial measurement unit), FIR (far infrared), accelerometers, gyroscopes, and magnetometers, for example. Any number of sensors may be operating on the vehicle 102. The vehicle 102 may have installed, or may be connected to a computing system 110 that includes one or more processors and memory. The one or more processors may include a centralized processor and/or a node. The one or more processors may be configured to perform various operations by interpreting machine-readable instructions. The operations may include receiving or obtaining, processing, fusing, and/or analyzing the sensor data captured by the aforementioned sensors, or receiving or processing queries associated with a navigation action, such as controlling one or more braking, steering, or clutch components of the vehicle 102 based on the analysis of the sensor data. The processing or analysis may include, operations of or associated with fusing data from the one aforementioned sensors. The data may include information captured in a form of various states, such as, a position, velocity, acceleration, and/or a classification of another target, such as an other vehicle 120. The Radars 104, 105, 106, and/or 107 may, in coordination with the computing system 110 may detect Doppler velocities from the other vehicle 120 in a radial direction from the other vehicle 120 to the particular Radar 104, 105, 106, or 107. The Radars 104, 105, 106, and 107 may determine distances and speeds of objects around the vehicle 102, and may be configured for adaptive cruise control, accident avoidance and blind spot detection. The Lidar 108 may, in coordination with the computing system 110, generate a three-dimensional map of the environment and detect objects and/or entities such as the other vehicle 120. The cameras 109 may, in coordination with the computing system 110, capture and process image data to detect and identify targets, such as the other vehicle 120, and objects, and decipher content of the objects. Such objects may include, but not limited to, pedestrians, road signs such as road markings or lane dividers, traffic lights, and/or other vehicles, for example. In some embodiments, the cameras 109 may recognize, interpret, and analyze road signs such as speed limit, school zone, and construction zone signs and traffic lights. In some embodiments, the cameras 109 may recognize walking movements of pedestrians or people, recognize hand gestures or hand signals from pedestrians such as an upraised hand to indicate that the pedestrian is intending to cross a street. Other sensors on the vehicle 102 that may be fused include Global Positioning System (GPS) devices, ultrasonic sensors, accelerometers, gyroscopes, magnetometers, inertial measurement units (IMUs), and far infrared (FIR) sensors.

The vehicle 102 may further include, be connected to, and/or have access to a server 112 which may store sensor data from the vehicle 102, one or more satellite maps, one or more road sensors such as sensors located on traffic lights, and/or from another vehicle such as the other vehicle 120. In some embodiments, based on the processed sensor data, the vehicle 102 can adjust vehicle speed based on speed limit signs posted on roadways. The vehicle 102 can also include myriad actuators to propel and navigate the vehicle 102. Such actuators may include, for example, any suitable electro-mechanical devices or systems to control a throttle response, a braking action, or a steering action. For example, the vehicle 102 can maintain a constant, safe distance from a vehicle ahead by constantly adjusting its vehicle speed to that of the vehicle ahead. In general, the vehicle 102 can effectuate any control to itself that a human driver can on a conventional vehicle. For example, the vehicle 102 can accelerate, brake, turn left or right, or drive in a reverse direction just as a human driver can on the conventional vehicle. Moreover, the vehicle 102 can perform more complex operations, such as parallel parking or parking in a crowded parking lot, without any human input.

Figure 2A:
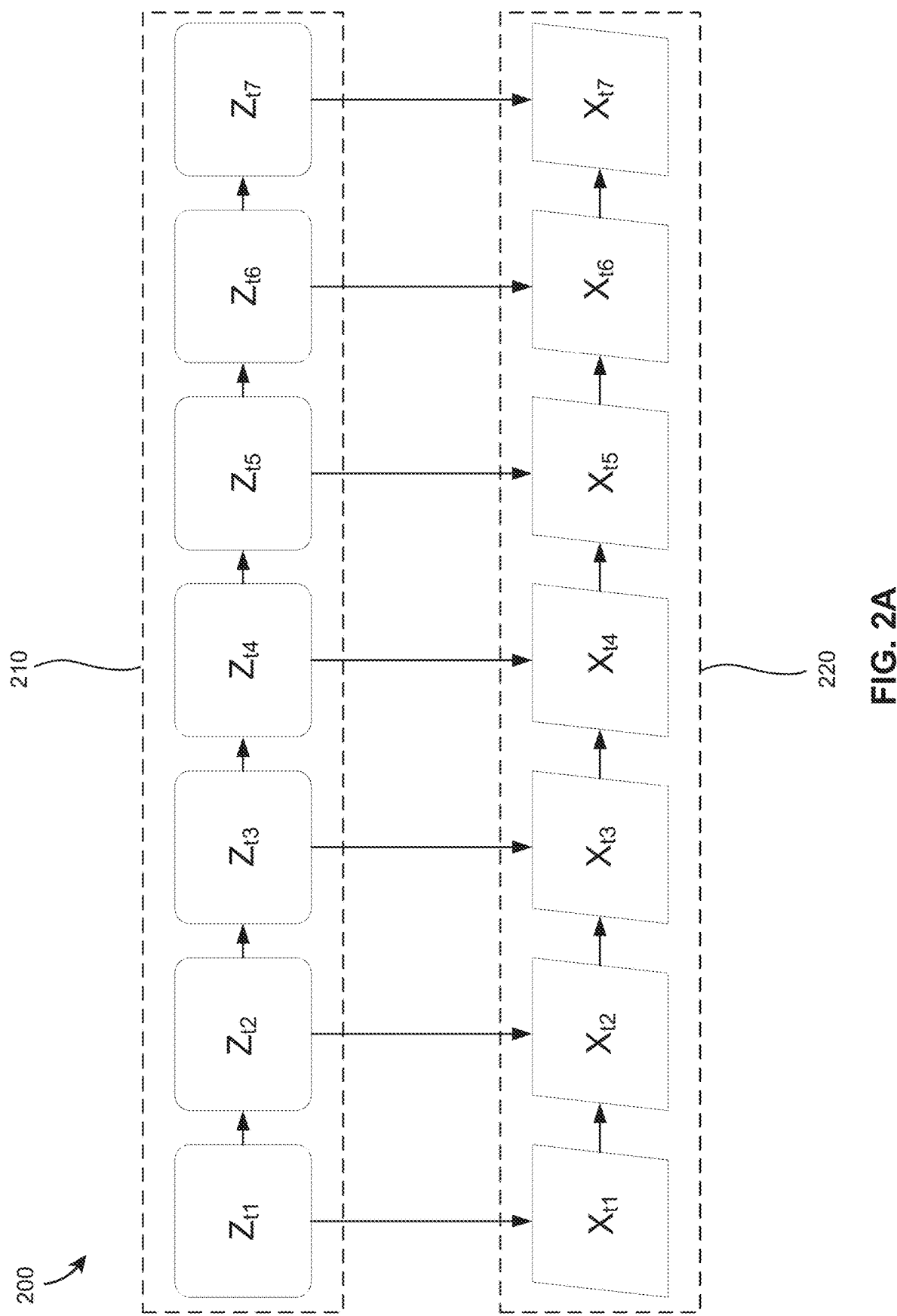
FIG. 2A illustrates an exemplary in sequence track in which data arrives at a processor or sensor in a same order as it was captured.

In FIG. 2A, an in sequence track 200 is illustrated. The in sequence track includes a measurement track 210 which includes actual measurements and/or classifications from a plurality of sensors, such as the Radars 104, 105, 106, and/or 107, Lidar 108, camera 109, GPS, ultrasonic, IMU (inertial measurement unit), FIR (far infrared), accelerometers, gyroscopes, or magnetometers. The measurement track 210 may further include timestamps indicating respective times at which the measurements were captured by the sensors. In particular, the measurements $Z_{t1}$, $Z_{t2}$, $Z_{t3}$, $Z_{t4}$, $Z_{t5}$, $Z_{t6}$, $Z_{t7}$ may have respective timestamps indicating that they were captured at times t1, t2, t3, t4, t5, t6, and t6, respectively. The measurements $Z_{t1}$, $Z_{t2}$, $Z_{t3}$, $Z_{t4}$, $Z_{t5}$, $Z_{t6}$, $Z_{t7}$ may fit or be approximated to fit a measurement model.

Meanwhile, a process track 220 includes states $X_{t1}$, $X_{t2}$, $X_{t3}$, $X_{t4}$, $X_{t5}$, $X_{t6}$, $X_{t7}$ calculated, determined, and/or outputted at a filter, which may be implemented as part of the computing system 110 as described in FIG. 1. The states $X_{t1}$, $X_{t2}$, $X_{t3}$, $X_{t4}$, $X_{t5}$, $X_{t6}$, $X_{t7}$ may be or include a posteriori states of the filter at the respective times. In some examples, once the filter receives a measurement $Z_{t1}$, the filter may combine the measurement $Z_{t1}$ with a state $X_{t1}$, obtain a weighted average of $Z_{t1}$ and $X_{t1}$, and calculate, determine, and/or output the state $X_{t2}$ based at least in part on the weighted average. The filter may receive the timestamp associated with the measurement $Z_{t1}$. Thus, a state of the filter may be synchronized with a time of capture of a most recently received measurement.

The filter may then receive a measurement $Z_{t2}$, obtain a weighted average of $Z_{t2}$ and $X_{t2}$, and calculate, determine, and/or output the state $X_{t3}$ based at least in part on the weighted average. The process may continue until a last measurement $Z_{t7}$ is received by the filter. In the in sequence track 200, the filter may receive all measurements $Z_{t1}$, $Z_{t2}$, $Z_{t3}$, $Z_{t4}$, $Z_{t5}$, $Z_{t6}$, $Z_{t7}$ in a same order that the measurements were captured by the sensors.

Figure 2B:
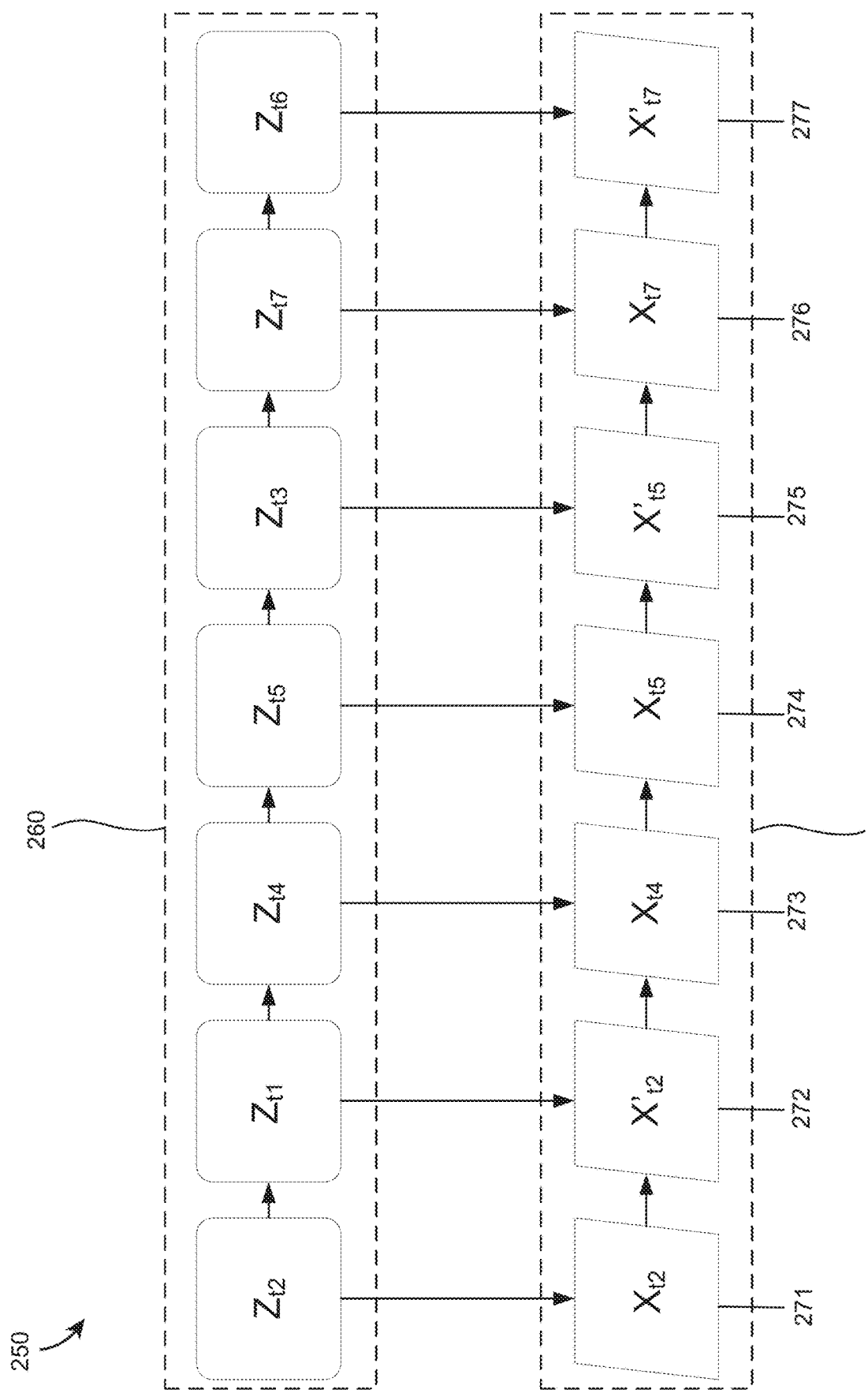
FIG. 2B illustrates an exemplary unsequenced track in which a portion of data arrives at a processor or sensor in a different order from which it was captured, according to an embodiment of the present disclosure.

In FIG. 2B, an unsequenced track 250 is illustrated, in which a filter may receive measurements in a different order from an order of capture by the sensors. The unsequenced track 250 includes a measurement track 260 which includes actual measurements and/or classifications from a plurality of sensors, such as the Radars 104, 105, 106, and/or 107, Lidar 108, camera 109, GPS, ultrasonic, IMU (inertial measurement unit), FIR (far infrared), accelerometers, gyroscopes, or magnetometers. The measurement track 260 may further include timestamps indicating respective times at which the measurements were captured by the sensors. In particular, the measurements $Z_{t2}$, $Z_{t1}$, $Z_{t4}$, $Z_{t5}$, $Z_{t3}$, $Z_{t7}$, and $Z_{t6}$, may have respective timestamps indicating that they were captured at times $t_2$, $t_1$, $t_4$, $t_5$, $t_3$, $t_7$, and $t_6$, respectively. The measurements $Z_{t1}$, $Z_{t2}$, $Z_{t3}$, $Z_{t4}$, $Z_{t5}$, $Z_{t6}$, $Z_{t7}$ may fit or be approximated to fit a measurement model. Thus, the filter may receive a measurement $Z_{t2}$ before receiving a measurement $Z_{t1}$ even though $Z_{t2}$ was captured after $Z_{t1}$ was captured. The filter may receive a measurement $Z_{t5}$ before receiving a measurement $Z_{t3}$ even though $Z_{t5}$ was captured after $Z_{t3}$. The filter may receive a measurement $Z_{t6}$ before receiving a measurement $Z_{t7}$ even though $Z_{t7}$ was captured after $Z_{t3}$. In some embodiments, if any of the measurements including $Z_{t2}$, $Z_{t1}$, $Z_{t4}$, $Z_{t5}$, $Z_{t3}$, $Z_{t7}$, and $Z_{t6}$ deviate from the measurement model, or cause deviation from the measurement model, by more than a threshold, these measurements may be removed, disregarded, or reduced in weight. If a measurement is reduced in weight, an amount by which the measurement is reduced in weight may be based on an amount of deviation of that measurement. In some embodiments, if a series of measurements from a same sensor or a same type of sensor deviates from the measurement model by more than a threshold, or causes deviation from the measurement model by more than a threshold, the entire series of measurements may be removed, disregarded, or reduced in weight. In some embodiments, if a series of measurements from a same sensor or a same type of sensor is only obtained sporadically at irregular intervals, that series or measurements may be removed, disregarded, or reduced in weight. Thus, determining whether a series of measurements should be retained or a weight assigned to a series of measurements may be based on a frequency and/or a regularity of an interval at which the measurements originate.

Meanwhile, a process track 270 includes states $X_{t2}$, $X'_{t2}$, $X_{t4}$, $X_{t5}$, $X'_{t5}$, $X_{t7}$, and $X'_{t7}$ calculated, determined, and/or outputted at a filter, which may be implemented as part of the computing system 110 as described in FIG. 1. The states $X_{t2}$, $X'_{t2}$, $X_{t4}$, $X_{t5}$, $X'_{t5}$, $X_{t7}$, and $X'_{t7}$ may be, or include, a posteriori states of the filter at the respective times. In some examples, once the filter receives the measurement $Z_{t2}$, the filter may calculate, determine, and/or output a state $X_{t2}$ and include a timestamp of $t_2$ at a stage 271. In some examples, once the filter receives the unsequenced measurement $Z_{t1}$ originating from the time $t_1$, the filter may retrodict to a state at a time $t_1$, associate with the unsequenced measurement $Z_{t1}$, and update the filter status at a time $t_2$ by using the corresponding unsequenced measurement $Z_{t1}$. Thus, the filter may maintain a same timestamp of $t_2$ at a stage 272, during which the filter may calculate, determine, and/or output a state $X'_{t2}$. In some examples, once the filter receives the measurement 44, the filter may calculate, determine, and/or output a state $X_{t4}$ while updating a timestamp to $t_4$ at a stage 273. In some examples, once the filter receives the measurement $Z_{t5}$, the filter may calculate, determine, and/or output a state $X_{t5}$ while updating a timestamp to $t_5$ at a stage 274. In some examples, once the filter receives the unsequenced measurement $Z_{t3}$ originating from the time $t_3$, the filter may retrodict to a state at a time $t_3$, associate with the unsequenced measurement $Z_{t3}$, and update the filter status at a time $t_5$ by using the corresponding unsequenced measurement $Z_{t3}$. Thus, the filter may maintain a same timestamp of $t_5$ at a stage 275, during which the filter may calculate, determine, and/or output a state $X'_{t5}$. In some examples, once the filter receives the measurement 47, the filter may calculate, determine, and/or output a state $X_{t7}$ and update a timestamp to $t_7$ at a stage 276. In some examples, once the filter receives the measurement $Z_{t6}$, the filter may retrodict to a state at a time $t_6$ while maintaining a same timestamp of $t_7$ at a stage 277, during which the filter may calculate, determine, and/or output a state $X'_{t7}$. Therefore, the filter timestamp may maintain a most recent capture time or originating time out of all received measurements even though an intermediate temporary state of the filter may be retrodicted to a previous state.

Figure 3:
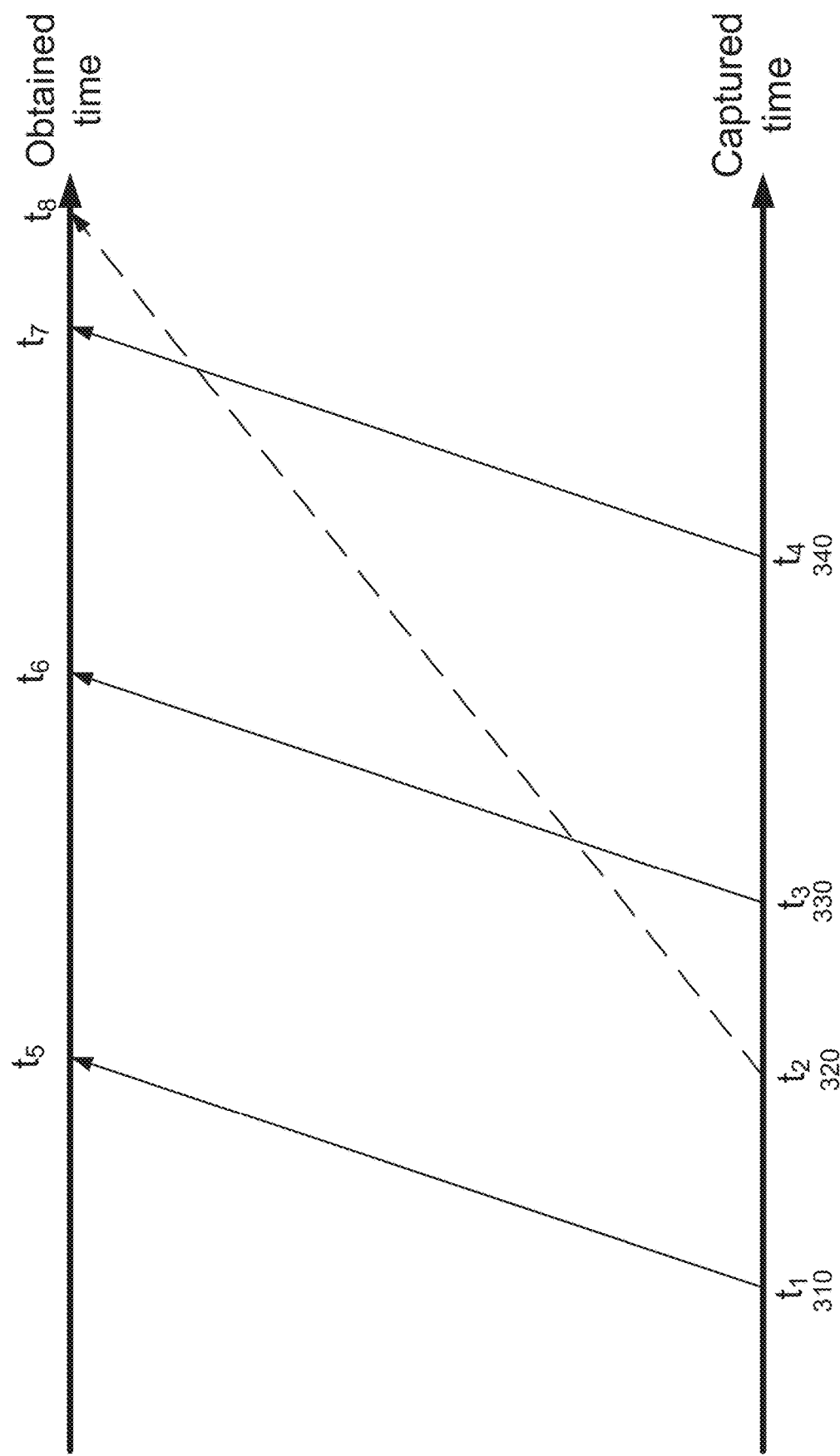
Figure 4:
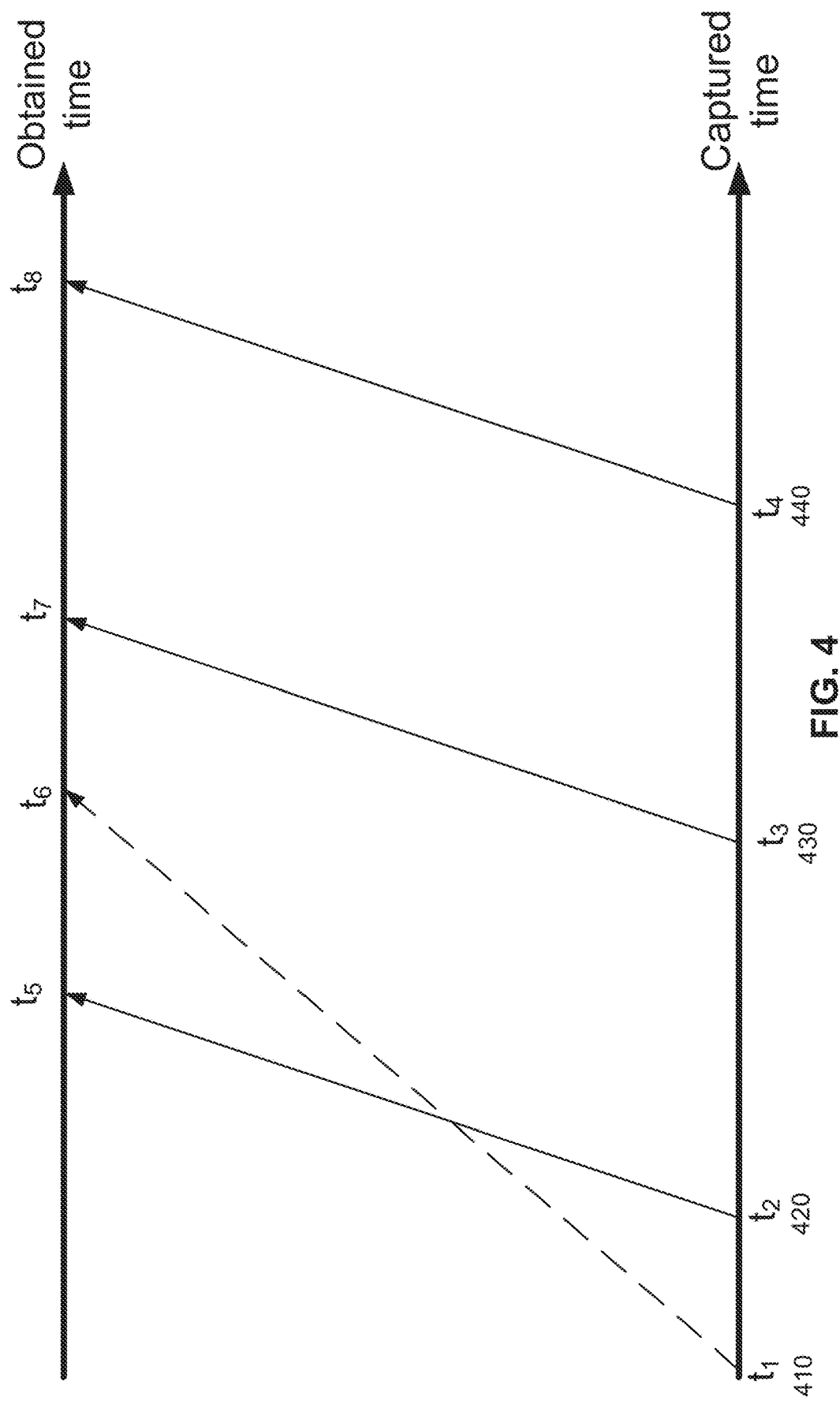

FIGS. 3-5 illustrate exemplary scenarios that include one or more unsequenced measurements captured by a filter. Concepts illustrated with respect to FIG. 2B may apply to FIGS. 3-5. In FIG. 3, an unsequenced measurement 320 may have been captured at a sensor at a time $t_2$ prior to measurements 330 and 340 captured at times $t_3$ and $t_4$, respectively. The unsequenced measurement 320 may have been captured and originated after a measurement 310 at a sensor at a time $t_1$. The unsequenced measurement 320 may have been received or obtained at a filter at a time $t_8$, which is after times $t_5$, $t_6$, and $t_7$ that the measurements 310, 330, and 340 were received or obtained, respectively. At least one of, or all of, the measurements 310, 330, and 340, and the unsequenced measurement 320, may have been captured by different sensors and/or different modalities of sensors. For example, the unsequenced measurement 320 may have been captured by camera while the measurements 310, 330, and 340 may have been captured by Radar or Lidar.

In FIG. 3, prior to the time $t_2$, the filter has already been initialized meaning that the filter has already established a state at the time $t_1$ from the measurement 310. The filter may have stored historical states and covariances, and corresponding timestamps, of the measurements 310, 330, and 340, which may be sequenced measurements that conform to a normal sequence of being transmitted to a filter in an order of origination. Thus, a state $X(t_2)$ at the time $t_2$ may be approximated using interpolation, given known states $X(t_3)$ and $X(t_1)$ that are immediately adjacent to $X(t_2)$:

$$X(t_2) = \frac{t_2 - t_1}{t_3 - t_1}(X(t_3) - X(t_1)) \quad (1)$$

More generally, Equation (1) may be written to approximate a state $X(t_d)$ at a time $t_d$:

$$X(t_d) = \frac{t_d - t_{d-1}}{t_{d+1} - t_{d-1}}(X(t_{d+1}) - X(t_{d-1})) \quad (2)$$

In FIG. 3, a reverse transition matrix from the time $t_4$ to the time $t_2$ may be determined. As described above, the filter receives or obtains the measurement 320 at time $t_8$. The filter may receive a most recent preceding measurement, the measurement 340 at time $t_7$, right before receiving or obtaining the measurement 320. The measurement 340 was captured at time $t_4$, and has a timestamp of the time $t_4$. Thus, right before the filter receives the measurement 320 at time $t_8$, the filter has a state corresponding to the time $t_4$. In order to properly process and/or fuse the measurement 320, the filter needs to retrodict to the time $t_2$, the originating time of the measurement 320. The reverse transition matrix $F(t_2, t_4)$ from a state at the time $t_4$ to a state at the time $t_2$ may be determined as follows:

$$F(t_2, t_4) = F(t_4, t_2)^{-1} = \frac{\partial F(X)}{\partial X}\bigg|_{\substack{dt = t_4 - t_2 \\ X = X(t_2)}}^{-1} \quad (3)$$

$F(t_4, t_2)^{-1}$ denotes an inverse of the matrix $$F(t_4, t_2) \text{ and } \frac{\partial F(X)}{\partial X}\bigg|_{\substack{dt = t_4 - t_2 \\ X = X(t_2)}}^{-1}$$

denotes an inverse of the matrix $$\frac{\partial F(X)}{\partial X}\bigg|_{\substack{dt = t_4 - t_2 \\ X = X(t_2)}} \cdot F(t_4, t_2)$$

denotes a transition matrix from a state at the time $t_2$ to a state at the time $t_4$.

More generally, in this scenario, the reverse transition matrix $F(t_d, t_k)$ from a state at a time $t_k$ to a state at a time $t_d$ may be written as follows, where d is less than k:

$$F(t_d, t_k) = F(t_k, t_d)^{-1} = \frac{\partial F(X)}{\partial X}\bigg|_{\substack{dt = t_k - t_d \\ X = X(t_d)}}^{-1} \quad (4)$$

In FIG. 4, an unsequenced measurement 410 may have been captured at a sensor at a time $t_1$ and originated prior to measurements 420, 430, and 440 captured at times $t_2$, $t_3$ and $t_4$, respectively. The unsequenced measurement 410 may have been received or obtained at a filter at a time $t_6$, which is after the time $t_5$ that the measurement 420 was received or obtained. At least one of, or all of, the measurements 420, 430, and 440, and the unsequenced measurement 410, may have been captured by different sensors and/or different modalities of sensors. For example, the unsequenced measurement 410 may have been captured by camera while the measurements 420, 430, and 440 may have been captured by Radar or Lidar.

In FIG. 4, prior to the time $t_1$, the filter has not been initialized yet. Thus, no history state before the time $t_1$ is available and no interpolation process as shown in FIG. 3 is carried out. The reverse transition matrix from the time $t_2$ to the time $t_1$ may be determined by using $$F(t_1, t_2) = \frac{\partial F(X)}{\partial X}\bigg|_{\substack{dt = t_1 - t_2 \\ X = X(t_2)}} \quad (5)$$

More generally, in this scenario, the reverse transition matrix $F(t_d, t_k)$ from a state at a time $t_k$ to a state at a time $t_d$ may be written as follows, where d is less than k:

$$F(t_d, t_k) = \frac{\partial F(X)}{\partial X}\bigg|_{\substack{dt = t_d - t_k \\ X = X(t_k)}} - 1 \quad (6)$$

In FIG. 5A, two unsequenced measurements 510 and 520 may have originated at times $t_1$ and $t_2$, respectively. The unsequenced measurements 510 and 520 may have originated before measurements 530 and 540 at times $t_3$ and $t_4$, respectively. The unsequenced measurements 510 and 520 may have been received or obtained at a filter at times $t_7$ and $t_8$, respectively, which are after the times $t_5$ and $t_6$ that the measurements 530 and 540 were received or obtained, respectively. At least one of, or all of, the unsequenced measurements 510, and 520, and the measurements 530, and 540, may have been captured by different sensors and/or different modalities of sensors. For example, the unsequenced measurements 510 and 520 may have been captured by camera while the measurements 530 and 540 may have been captured by Radar or Lidar.

In FIG. 5A, the filter has not been initialized with a time $t_2$ before the unsequenced measurement 520 is obtained or received at the filter at the time $t_7$. Thus, no history state before the time $t_2$ is available and no interpolation process as shown in FIG. 3 is carried out. The filter receives or obtains, at the time $t_6$, the measurement 540 which originates at the time $t_4$. Subsequently, the filter receives or obtains, at the time $t_7$, the measurement 520 which originates at the time $t_2$. Thus, right before the filter receives the measurement 520 at the time $t_7$, the filter has a state corresponding to the time $t_4$. In order to properly process and/or fuse the measurement 520, the filter needs to retrodict to the time $t_2$, the originating time of the measurement 520. Thus, a reverse transition matrix from the time $t_4$ to the time $t_2$ needs to be determined. The reverse transition matrix from the time $t_4$ to the time $t_2$ may be determined by using an equation based on a same concept as Equation 6:

$$F(t_2, t_4) = \frac{\partial F(X)}{\partial X} \bigg|_{X = X(t_4)} \quad dt = t_2 - t_4 \tag{7}$$

Next, the filter may receive or obtain the unsequenced measurement 510. In some embodiments, correlations between the unsequenced measurements 510 and 520 may be updated. In order to properly process and/or fuse the measurement 510, the filter needs to retrodict to the time $t_1$, the originating time of the measurement 510. Thus, a reverse transition matrix from the time $t_2$ to the time $t_1$ needs to be determined. The reverse transition matrix from the time $t_2$ to the time $t_1$ may be determined by using the same equation as Equation (5).

Figure 5B:
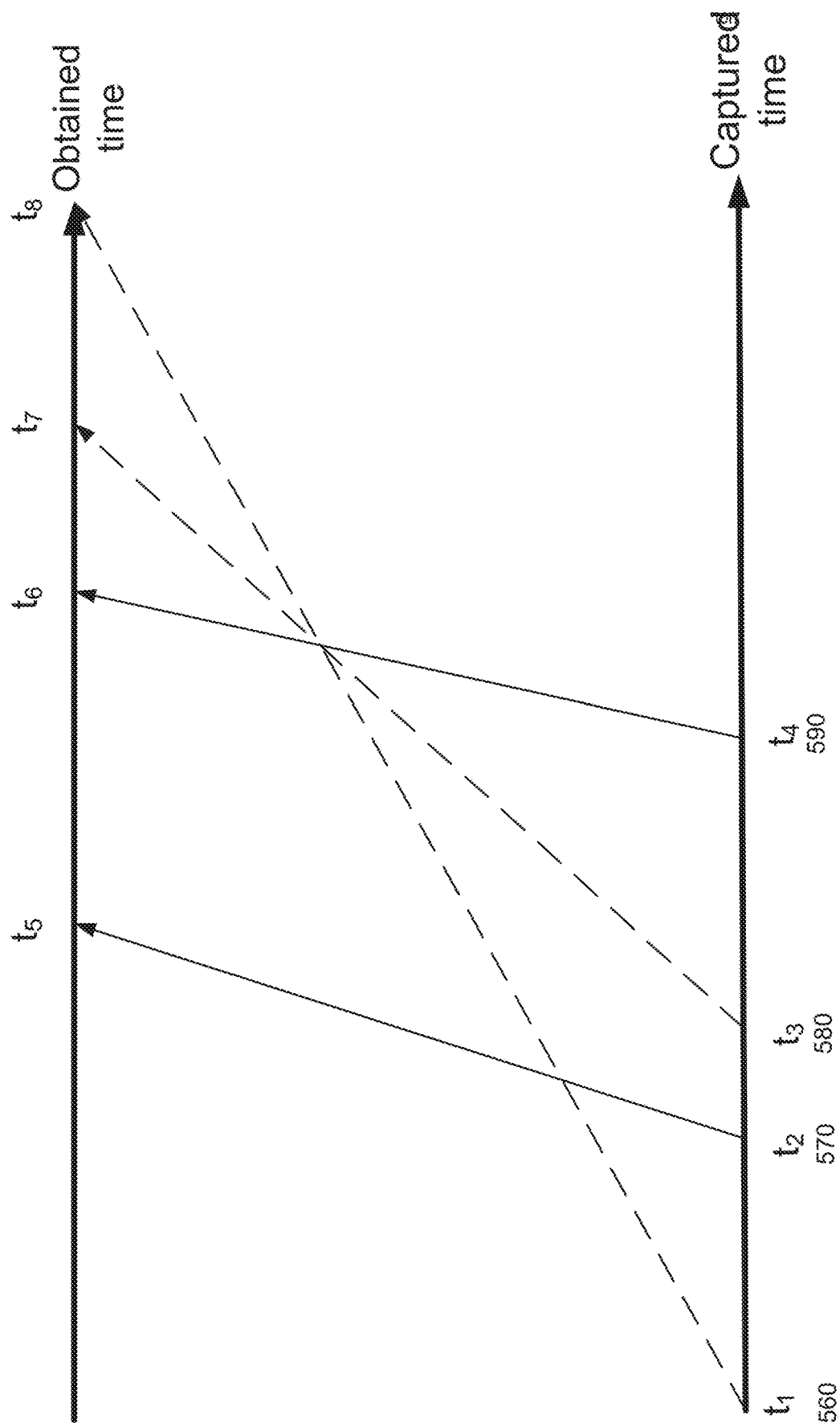

In FIG. 5B, two unsequenced measurements 560 and 580 may have originated at times $t_1$ and $t_3$, respectively. The unsequenced measurement 560 may have originated before a measurement 570, which originated at a time $t_2$. The unsequenced measurement 580 may have originated after the measurement 570 and before a measurement 590, which originated at a time $t_4$. An order or sequence in which the unsequenced measurements and the measurements are obtained or received by a filter may be, first, the measurement 570 at the time $t_5$, the measurement 590 at the time $t_6$, the measurement 580 at the time $t_7$, and the measurement 560 at the time $t_8$. At least one of, or all of, the unsequenced measurements 560 and 580, and the measurements 570 and 590, may have been captured by different sensors and/or different modalities of sensors. For example, the unsequenced measurements 560 and 580 may have been captured by camera while the measurements 570 and 590 may have been captured by Radar or Lidar.

In FIG. 5B, when the filter receives or obtains the measurement 580 at the time $t_7$, the filter has already been initialized with previous states at the times $t_2$ and $t_4$. Thus, a state $X(t_3)$ at the time $t_3$ may be approximated using interpolation, given known states $X(t_4)$ and $X(t_2)$ at the times $t_4$ and $t_2$ that are immediately adjacent to the time $t_3$, using a same concept as Equation (2):

$$X(t_3) = \frac{t_3 - t_2}{t_4 - t_2}(X(t_4) - X(t_2)) \tag{8}$$

In FIG. 5B, a reverse transition matrix from the time $t_4$ to the time $t_3$ may be determined. As described above, the filter receives or obtains the measurement 590 at the time $t_6$. The measurement 590 originated at the time $t_4$. Thus, right before the filter receives the measurement 580 at the time $t_7$, the filter has a state corresponding to the time $t_4$. In order to properly process and/or fuse the measurement 580, the filter needs to retrodict to the time $t_3$, the originating time of the measurement 580. The reverse transition matrix $F(t_3, t_4)$ from a state at the time $t_4$ to a state at the time $t_3$ may be determined as follows:

$$F(t_3, t_4) = F(t_4, t_3)^{-1} = \frac{\partial F(X)}{\partial X}\bigg|_{X = X(t_3)} \quad dt = t_4 - t_3 \quad -1 \tag{9}$$

Next, the filter may receive or obtain the unsequenced measurement 560 at the time $t_8$. In some embodiments, correlations between the unsequenced measurements 560 and 580 may be updated. In order to properly process and/or fuse the measurement 560, the filter needs to retrodict to the time $t_1$, the originating time of the measurement 560. Thus, a reverse transition matrix from a state at the time $t_3$ to a state at the time $t_1$ needs to be determined. This reverse transition matrix from the time $t_3$ to the time $t_1$ may be determined as follows:

$$F(t_1, t_3) = \frac{\partial F(X)}{\partial X}\bigg|_{X = X(t_3)} \quad dt = t_1 - t_3 \tag{10}$$

An overall approach illustrated in FIGS. 3-4 and 5A-5B may include one or more processors initially storing states, covariances, and corresponding timestamps of the sequenced measurements, which are not unsequenced. Then, the one or more processors may, upon detecting an unsequenced measurement, attempt to retrieve a nearest state of which an origination time was closest in time to and prior to an origination time of the unsequenced measurement. If the one or more processors retrieves such a nearest state, the one or more processors may determine the state corresponding to the time of origination of the unsequenced measurement using the interpolation approach as shown in FIG. 3, for example. The one or more processors may then determine a reverse transition matrix as shown in FIG. 3. Otherwise, the one or more processors may skip the interpolation approach and determine a reverse transition matrix as shown in FIG. 4. The following equations apply:

$$\check{x}(d|k) = F(d,k)(\check{x}(k|k) - Q(k,d)H^*(k)^T S^*(k)^{-1} v^*(k)) \tag{11}$$

Here, $\check{x}(d|k)$ is a retrodicted state from a time k to a time d, where d is less than k. $\check{x}(k|k)$ is an updated state of $x(k)$, which may be a state vector including, for example, position and velocity. $v^*(k)$ may be an equivalent innovation. $Q(k, d)$ may be a known noise covariance matrix such as a process noise covariance matrix. $H^*(k)$ and F may be known system matrices. $H^*(k)$ may be an output transition matrix.

An equivalent measurement matrix may follow:

$$H^*(k) = I \tag{12}$$

An inverse of the covariance of the equivalent measurement may be given by $S^*(k)^{-1}$. $R^*(k)^{-1}$ may be a measurement noise covariance matrix. $P(k|k-l)$ may be a prior covariance at time k−l. These variables may be defined, along with associated variables, as follows:

$$S^*(k)^{-1} = P(k|k-l)^{-1} - P(k|k-l)^{-1}(P(k|k-l)^{-1} + R^*(k)^{-1})^{-1} P(k|k-l)^{-1} \tag{13}$$

$$R^*(k)^{-1} = P(k|k)^{-1} - P(k|k-l)^{-1} \tag{14}$$

$$P(k|k-l) = F(k|k-l)P(k-l,k-l)F(k|k-l)^T + Q(k,k-l) \tag{15}$$

$$v^*(k) = W^*(k)^{-1}(\check{x}(k|k-l) - \check{x}(k|k-l)) \tag{16}$$

$$W^*(k) = P(k|k)H^*(k)^T R^*(k)^{-1} \tag{17}$$

Figure 6A:
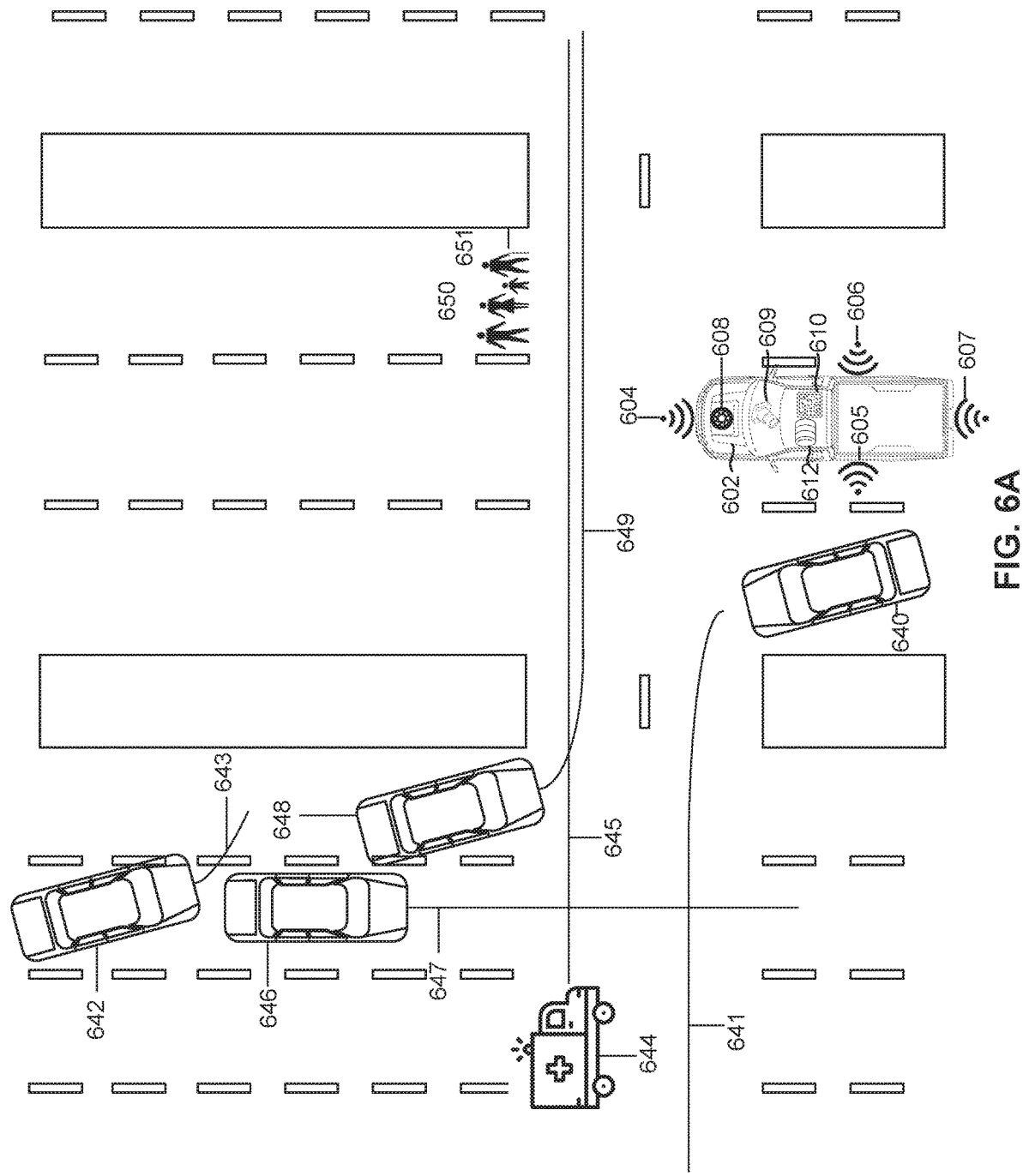
FIGS. 6A-6B illustrate exemplary implementations according to an embodiment of the present disclosure.

In FIG. 6A, a computing system 610 associated with a vehicle 602, which may be implemented as the computing system 110 associated with the vehicle 102 of FIG. 1, may be configured to fuse sensor data from one or more targets such as a vehicle 640, a vehicle 642, a vehicle 646, a vehicle 648, an emergency vehicle 644, and one or more pedestrians 650. FIG. 6A may be implemented in conjunction with any of the principles described earlier, such as in FIGS. 2B, 3, 4, 5A-5B. The vehicle 602 may include installed sensors including Radars 604, 605, 606, and/or 607, Lidar 608, camera 609, GPS, ultrasonic, IMU (inertial measurement unit), FIR (far infrared), sonar, accelerometers, gyroscopes, and magnetometers, for example. Any number of sensors may be operating on the vehicle 602. The vehicle 602 may further have, be connected with, and/or have access to a server 612 which may store sensor data from the vehicle 602, one or more satellite maps, one or more road sensors such as sensors located on traffic lights, and/or from another vehicle.

From the fused sensor data, which may include, a position, pose, velocity, acceleration, and/or a category or classification of a type of the target, the vehicle 602 may estimate trajectories 641, 643, 647, and 649 of the respective vehicles 624, 644, 646, and 648, a trajectory 645 of the emergency vehicle 644, and a trajectory 651 of the one or more pedestrians 650.

Based on the estimated trajectories and/or the inferred intentions, one or more processors of the computing system 610 may control steering components, braking components, and/or a gas pedal to navigate the vehicle 602 and plan a route that safely avoids the trajectories of the aforementioned vehicles and pedestrians. For example, the planned route may maximize or optimize a safety by minimizing a risk of collision, or of a trajectory of the vehicle 602 intersection with one or more of the trajectories 641, 643, 645, 647, 649, and/or 651.

Figure 6B:
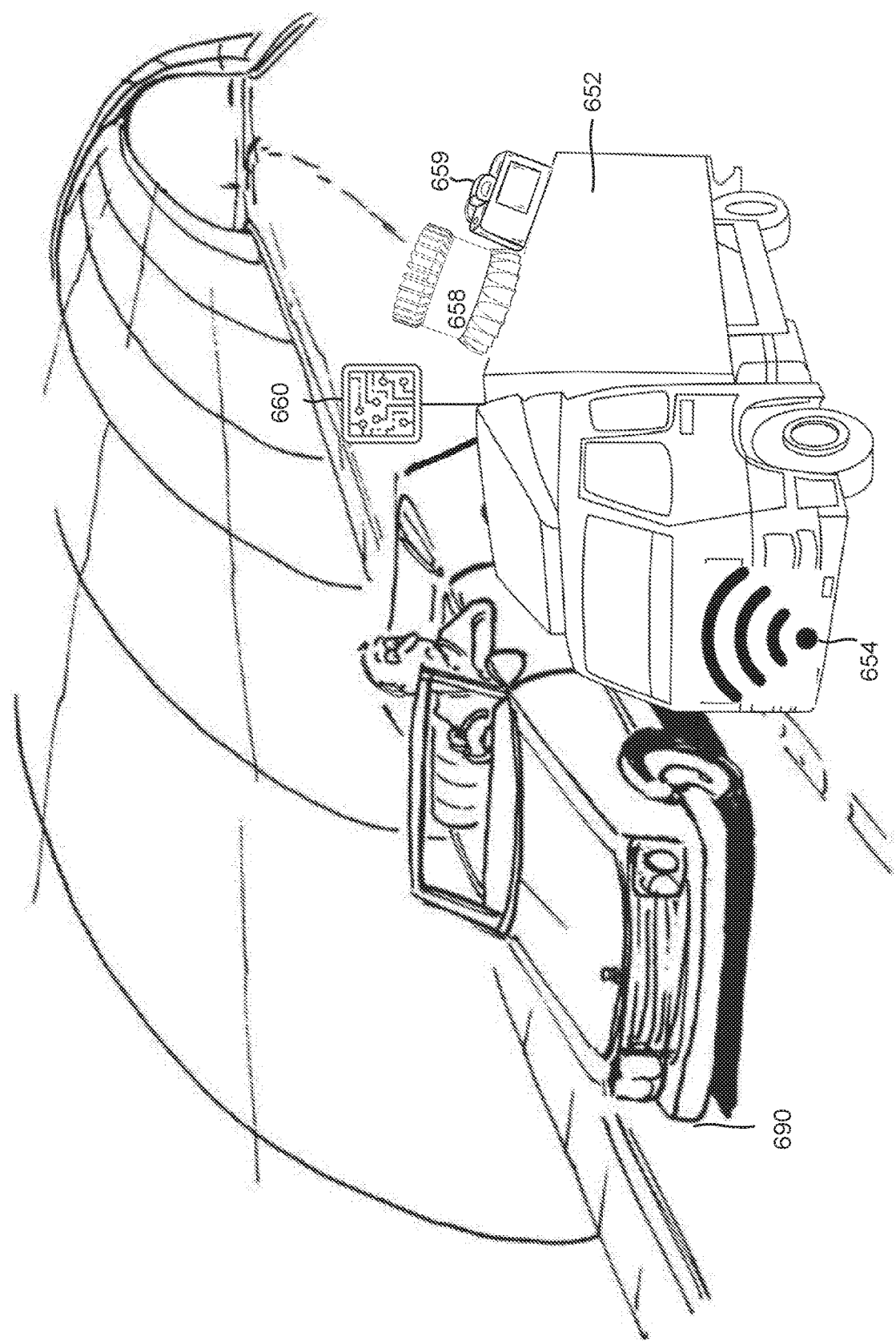

In FIG. 6B, a computing system 660 associated with a vehicle 652, which may be implemented as the computing system 110 associated with the vehicle 102 of FIG. 1, may be configured to fuse sensor data from one or more targets such as a vehicle 690, in an environment such as a tunnel. The vehicle 652 may include installed sensors including a Radar 654, Lidar 658, camera 659, GPS, ultrasonic, IMU (inertial measurement unit), FIR (far infrared), sonar, accelerometers, gyroscopes, and magnetometers, for example. Any number of sensors may be operating on the vehicle 652. Other components on the vehicle 652 may not be shown for simplicity but may be present. For example, any of the components of the vehicle 102 may also be present in the vehicle 652.

The computing system 660 may fuse data from one or more of the sensors including the Radar 654, the Lidar 658, and the camera 659. However, if a particular type of sensor provides measurements that deviate from the measurement model or cause deviations in the measurement model by more than a threshold, and/or result in larger variances in the process model, then measurements from that type of sensor may be removed, disregarded, or reduced in weight. For example, Radar may be inaccurate within a tunnel, so the Radar 654 may provide measurements that deviate from the measurement model or cause the measurement model to deviate by more than the threshold. From the fused sensor data, which may include, a position, pose, velocity, acceleration, and/or a category or classification of a type of the target 690, one or more processors of the computing system 660 may control steering components, braking components, and/or a gas pedal to navigate the vehicle 602 and plan a route that safely avoids the vehicle 690.

Figure 7:
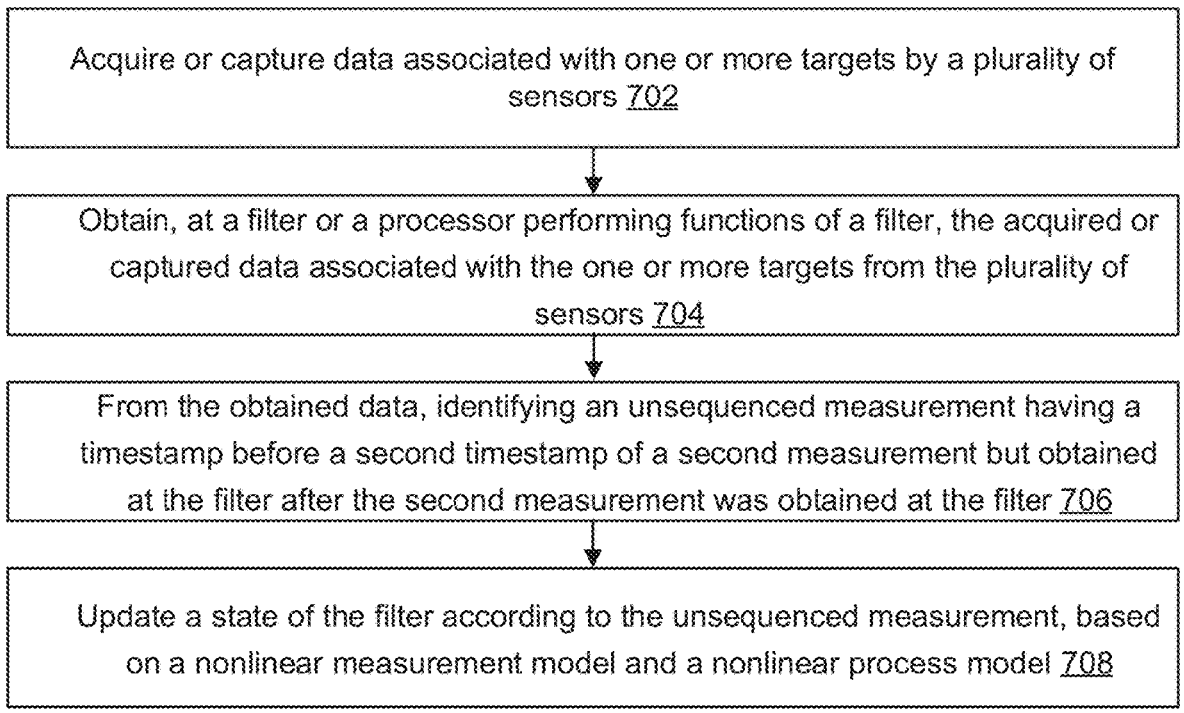
FIG. 7 illustrates a flowchart of an example of a method in accordance with the aforementioned disclosures.

FIG. 7 illustrates a flowchart of a method according to some embodiments. In this and other flowcharts, the flowchart 700 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 7.

In step 702, a plurality of sensors such as camera, Lidar, and Radar sensors, may acquire or capture data associated with one or more targets. In step 704, one or more processors performing functions of a filter may obtain the acquired or captured data associated with one or more targets from the plurality of sensors. In step 706, the one or more processors may, from the obtained data, identify an unsequenced measurement having a timestamp before a second timestamp of a second measurement but obtained at the filter after the second measurement was obtained at the filter. In step 708, the one or more processors may update a state of the filter according to the unsequenced measurement, based on a nonlinear measurement model and a nonlinear process model.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 8:
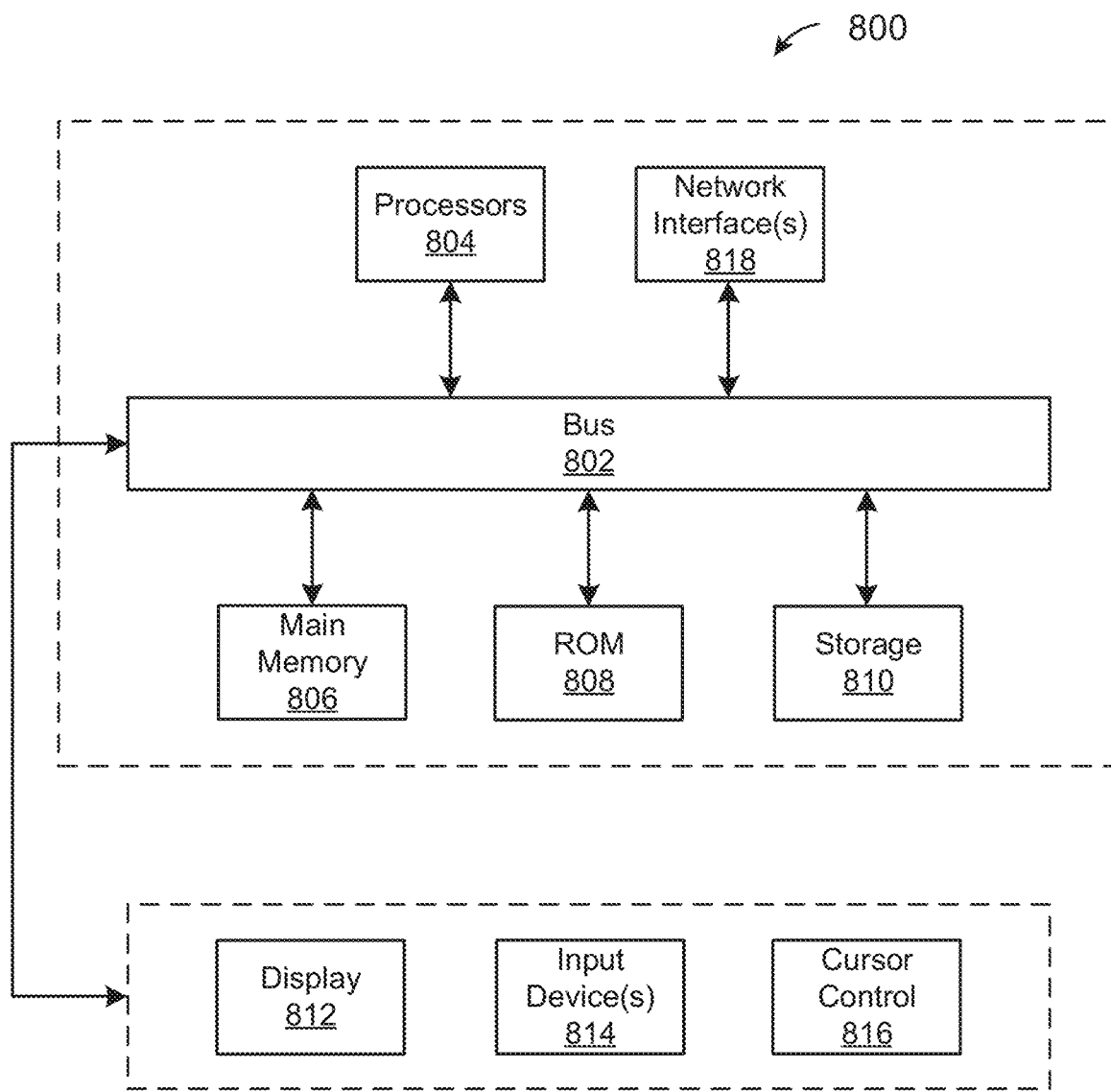
FIG. 8 is a diagram of an exemplary computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. A description that a device performs a task is intended to mean that one or more of the hardware processor(s) 804 performs.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816. The computer system 800 also includes a communication interface 818 coupled to bus 802.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Numerals inside parentheses, such as (3), that immediately follow equations, are meant to refer to equation numbers, and are not part of the equations themselves.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

The invention claimed is:

1. A computer implemented method performed by one or more processors, comprising:
    capturing data, using a plurality of sensors, associated with one or more targets, the data including timestamps indicating originating times;
    obtaining, at a filter, the data associated with the one or more targets from the plurality of sensors, the data including the timestamps indicating the originating times;
    from the obtained data, identifying an unsequenced measurement having a first timestamp corresponding to a first time of the filter before a second timestamp corresponding to a second time of a second measurement but obtained at the filter after the second measurement was obtained at the filter;
    updating a state of the filter according to the unsequenced measurement, based on a nonlinear measurement model or a nonlinear process model, wherein the updating of the state of the filter comprises retrodicting the filter, from a current state or a most recent state corresponding to the second timestamp or corresponding to a different timestamp, to an updated state corresponding to the first timestamp, wherein the updating of the state of the filter fuses the unsequenced measurement with other measurements comprised within the obtained data, thereby resolving the unsequenced measurement, wherein the retrodicting comprises:
        determining an availability of two known states of the filter, wherein the two known states comprise a value of an immediately preceding state to the unsequenced measurement of the filter and a value of an immediately subsequent state to the unsequenced measurement of the filter; and
        in response to positively determining the availability of the two known states, interpolating based on the two known states;
    estimating one or more attributes of the one or more targets based on the updated state of the filter; and
    performing a navigation action on a vehicle based on the estimated one or more attributes, wherein the navigation action comprises adjusting a speed and a direction of the vehicle to navigate around the one or more targets, wherein the one or more targets comprise any of other vehicles, pedestrians, road signs, or road signals.

2. The computer implemented method of claim 1, wherein the immediately preceding state of the filter corresponds to the initial measurement; and the immediately subsequent state of the filter corresponds to the second timestamp.

3. The computer implemented method of claim 2, further comprising determining that the two known states of the filter are unavailable; and in response to determining that the two known states of the filter are unavailable, obtaining a reverse transition matrix, wherein the reverse transition matrix is obtained based on an inverse of a partial derivative of a nonlinear transition function with respect to the state of the filter corresponding to the second time, the nonlinear transition function being included in the nonlinear process model.

4. The computer implemented method of claim 1, wherein, in response to determining that the two known states of the filter are unavailable, the retrodicting the state of the filter comprises determining a reverse transition matrix indicating a transition between a state of the filter at a fourth time or the state of the filter corresponding to the second time, and the state of the filter at the first time, the fourth time indicating an originating time of an immediately preceding measurement to the unsequenced measurement obtained by the filter, the fourth time being different from the second time.

5. The computer implemented method of claim 4, wherein the reverse transition matrix is determined based on an inverse of a partial derivative of a function represented by a transition matrix with respect to the state corresponding to the fourth time.

6. The computer implemented method of claim 1, wherein the state indicates at least positions and velocities of the one or more targets.

7. The computer implemented method of claim 1, wherein the performing of the navigation action comprises performing an action regarding a steering component, a braking component, or a gas pedal to navigate the vehicle.

8. The computer implemented method of claim 1, wherein the interpolating between two known states of the filter is performed without applying a reverse transition matrix.

9. A system configured to fuse data, comprising:
    a plurality of sensors configured to capture data associated with one or more targets, the data including timestamps indicating originating times;
    one or more processors; and
    a memory storing instructions that, when executed by the one or more processors, causes the system to perform:
        obtaining, at a filter, transmitted data associated with the one or more targets from the plurality of sensors and including the timestamps indicating the originating times;
        from the obtained data, identifying an unsequenced measurement having a first timestamp corresponding to a first time of the filter before a second timestamp corresponding to a second time of a second measurement but obtained at the filter after the second measurement was obtained at the filter;

updating a state of the filter according to the unsequenced measurement, based on a nonlinear measurement model or a nonlinear process model, wherein the updating of the state of the filter comprises retrodicting the filter, from a current state or a most recent state corresponding to the second timestamp or corresponding to a different timestamp, to an updated state corresponding to the first timestamp, wherein the updating of the state of the filter fuses the unsequenced measurement with other measurements comprised within the obtained data, thereby resolving the unsequenced measurement, wherein the retrodicting comprises:

determining an availability of two known states of the filter, wherein the two known states comprise a value of an immediately preceding state to the unsequenced measurement of the filter and a value of an immediately subsequent state to the unsequenced measurement of the filter; and in response to positively determining the availability of the two known states, interpolating based on the two known states;

estimating one or more attributes of the one or more targets based on the updated state of the filter; and performing a navigation action on a vehicle based on the estimated one or more attributes, wherein the navigation action comprises adjusting a speed and a direction of the vehicle to navigate around the one or more targets, wherein the one or more targets comprise any of other vehicles, pedestrians, road signs, or road signals.

10. The system of claim 9, wherein the immediately preceding state of the filter corresponds to the initial measurement; and the immediately subsequent state of the filter corresponds to the second timestamp.

11. The system of claim 10, further comprising determining that the two known states of the filter are unavailable; and in response to determining that the two known states of the filter are unavailable, obtaining a reverse transition matrix, wherein the reverse transition matrix is obtained based on an inverse of a partial derivative of a nonlinear transition function with respect to the state of the filter corresponding to the second time, the nonlinear transition function being included in the nonlinear process model.

12. The system of claim 9, wherein, in response to determining that the two known states of the filter are unavailable, the retrodicting the state of the filter comprises determining a reverse transition matrix indicating a transition between a state of the filter at a fourth time or the state of the filter corresponding to the second time, and the state of the filter at the first time, the fourth time indicating an originating time of an immediately preceding measurement to the unsequenced measurement obtained by the filter, the fourth time being different from the second time.

13. The system of claim 12, wherein the reverse transition matrix is determined based on an inverse of a partial derivative of a function represented by a transition matrix with respect to the state corresponding to the fourth time.

14. The system of claim 9, wherein the state indicates at least positions and velocities of the one or more targets.

* * * * *